Jan. 7, 1930.  G. E. PARKER  1,742,782
TIE ROD CONNECTION
Filed Aug. 8, 1924
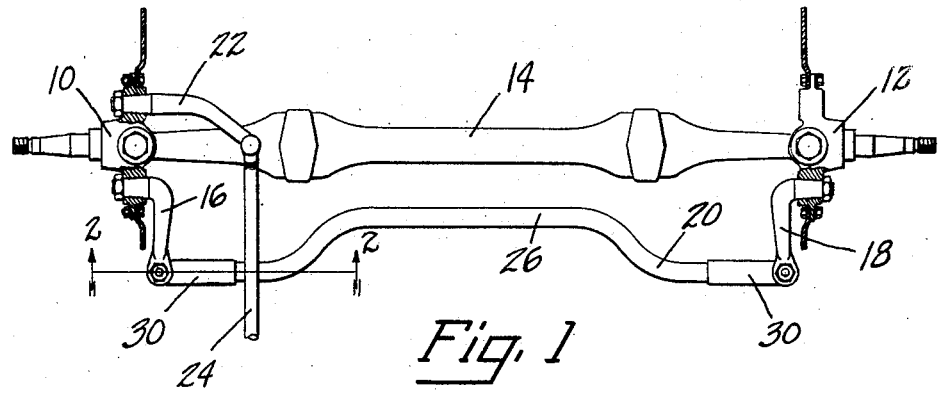
Fig. 1
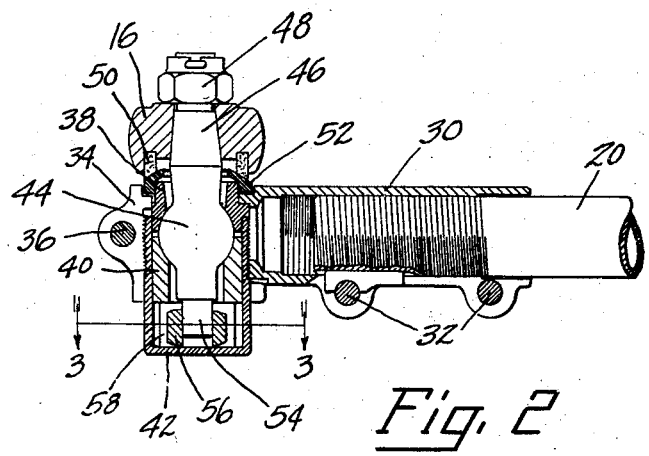
Fig. 2
Fig. 3
INVENTOR
Guy E. Parker
BY
ATTORNEYS Patented Jan. 7, 1930

1,742,782

UNITED STATES PATENT OFFICE

GUY E. PARKER, OF DETROIT, MICHIGAN, ASSIGNOR TO GENERAL MOTORS CORPORATION, OF DETROIT, MICHIGAN, A CORPORATION OF DELAWARE

TIE-ROD CONNECTION

Application filed August 8, 1924. Serial No. 730,863.

This invention relates to automobiles, and is illustrated as embodied in a Cadillac having a novel connection between the cross tie rod and the steering arms of the front wheel knuckles.

In some automobiles, the center of the cross tie rod is offset, e. g. forwardly, to provide clearance for other parts of the chassis. This gives an eccentric weight tending to twist the tie rod about its longitudinal axis, and the constant and long-continued vibration of this eccentric weight in driving tends to produce undue wear in the universal joints at opposite ends of the tie rod, so that sometimes a rattle finally develops.

The present invention relates to taking the torque of the offset part of the tie rod, by a novel ball and socket joint. In one desirable arrangement the ball member of the joint has a vertical extension engaging a guide permitting the necessary sidewise swinging, but positively preventing any swinging of the ball member in a plane at right angles to the front axle, so that the torque does not come on the ball and socket joint proper but is taken by the guide. The guide may be a block sliding between parallel crosswise vertical surfaces on one of the socket members of the joint.

The above and other objects and features of the invention will be apparent from the following description of one illustrative embodiment shown in the accompanying drawings, in which:

Figure 1 is a top plan view of a front axle assembly, showing the arrangement of the parts with respect to the cross tie rod;

Figure 2 is a vertical section on the line 2—2 of Figure 1, showing one of the ball and socket joints; and Figure 3 is a horizontal section on the line 3—3 of Figure 2, showing the above-mentioned guide.

In the arrangement selected for illustration, knuckles 10 and 12, swiveled to opposite ends of a dead axle 14, have steering arms 16 and 18 connected by a cross tie rod 20. The knuckles are controlled by a steering column (not shown), operating an arm 22 on one knuckle by means of a drag link or pitman 24. The cross tie rod 20 is forwardly offset at its center 26, to clear a part of the chassis which is not shown. Except as further described below, the above-enumerated parts may be of any desired construction.

At each end the tie rod is adjustably threaded into a head 30, the adjustment being held by clamp bolts 32. Each head 30 has at its end a vertical split sleeve 34 which can be tightened by a clamp screw 36. Inside of this sleeve are held an upper half socket 38 and a lower half socket 40 inclosed in a lubricant-tight cup 42 threaded into the sleeve. Between the two half sockets is a ball member 44 having an upper attaching extension 46 with a conical part held in a corresponding socket in arm 16 (or 18) by a castellated nut 48. Arm 16 carries a lubricant-sealing gasket 50 engaging a spherical or conical surface on a retainer or washer 52, to prevent loss of lubricant. It should be noted that the half socket 38 has an opening for extension 46, and that surrounding this opening is a spherical surface engaging the ball member 44.

Ball member 44 also has a lower cylindrical extension 54, extending through an opening in socket member 40, which has a surrounding spherical surface engaging the ball member. This lower extension engages a guide such as a hardened sliding block 56 having a cylindrical opening fitting over the extension, and also having opposite flat sides engaging parallel vertical crosswise surfaces on two projections 58 and 60 forming part of socket member 40. Thus the torque of vibrations of center 26 of the tie rod comes on the guide or block 56 and projections 58 and 60, instead of on the parts of the ball and socket joint proper. With this construction the tie rod cannot rotate about its longitudinal axis but can swing about a vertical axis passing through the ball member 44 and can also swing bodily about a horizontal axis passing through the same member. The linkage is thus permitted to accommodate itself to the various positions of the stub axles in steering.

While one illustrative embodiment has been described in detail, it is not my intention to limit the scope of the invention to that particular embodiment, or otherwise than by the terms of the appended claims.

I claim:

1. A ball and socket joint comprising, in combination, a ball member having an attaching extension and a diametrically opposite cylindrical extension, a half socket having an opening for the attaching extension and a surrounding spherical surface engaging the ball member, a cooperating half socket having an opening for the cylindrical extension and a surrounding spherical surface engaging the ball member and formed with a pair of opposite projections having parallel surfaces on opposite sides of the cylindrical extension, and a slide block having a cylindrical opening fitting over the cylindrical extension and having opposite flat sides slidably engaging said parallel surfaces.

2. A steering gear joint for connecting a knuckle arm to an angularly extending tie rod that has an offset portion intermediate its ends, including a vertically projecting stud carried by the arm and having an enlarged ball portion intermediate its ends, a socket for the ball, secured to the tie rod, bearing lugs associated with said socket on opposite sides of one end of the vertical stud, with flat bearing surfaces extending in the direction of the tie rod, and a slide block rotatable on said stud end and slidingly engageable with the bearing surfaces of the lugs.

In testimony whereof I affix my signature.

GUY E. PARKER.